(12) United States Patent
Akiyama et al.

(10) Patent No.: US 11,560,174 B2
(45) Date of Patent: Jan. 24, 2023

(54) AUTOMATIC STEERING CONTROL DEVICE

(71) Applicant: SUBARU CORPORATION, Tokyo (JP)

(72) Inventors: Satoru Akiyama, Tokyo (JP); Eiichi Shiraishi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 436 days.

(21) Appl. No.: 16/730,204

(22) Filed: Dec. 30, 2019

(65) Prior Publication Data

US 2020/0307685 A1 Oct. 1, 2020

(30) Foreign Application Priority Data

Mar. 25, 2019 (JP) .............................. JP2019-057258

(51) Int. Cl.
| | |
|---|---|
| *B60W 30/09* | (2012.01) |
| *B60W 30/12* | (2020.01) |
| *G05D 1/02* | (2020.01) |
| *B60W 10/20* | (2006.01) |
| *B62D 5/04* | (2006.01) |
| *B62D 6/04* | (2006.01) |
| *B62D 6/00* | (2006.01) |
| *B62D 15/02* | (2006.01) |
| *G06V 20/56* | (2022.01) |

(52) U.S. Cl.
CPC ......... *B62D 6/003* (2013.01); *B62D 15/0215* (2013.01); *G05D 1/0212* (2013.01); *G05D 1/0246* (2013.01); *G06V 20/588* (2022.01); *B62D 5/0409* (2013.01); *G05D 2201/0213* (2013.01)

(58) Field of Classification Search
None
See application file for complete search history.

(56) References Cited

U.S. PATENT DOCUMENTS

| | | | | |
|---|---|---|---|---|
| 2020/0198699 | A1* | 6/2020 | Lee | B62D 6/04 |
| 2020/0317196 | A1* | 10/2020 | Yoshida | B60W 10/20 |
| 2021/0188258 | A1* | 6/2021 | Goto | G08G 1/16 |

FOREIGN PATENT DOCUMENTS

JP 2002-331947 A 11/2002

* cited by examiner

*Primary Examiner* — Adam D Tissot
*Assistant Examiner* — Laura E Linhardt
(74) *Attorney, Agent, or Firm* — McDermott Will & Emery LLP

(57) ABSTRACT

An automatic steering control device includes a forward recognition device, a traveling state detector, a lateral positional deviation calculator, a steering angle controller. The lateral positional deviation calculator calculates a first lateral positional deviation that is the lateral positional deviation ahead of the vehicle by a first distance, and a second lateral positional deviation that is the lateral positional deviation ahead of the vehicle by a second distance larger than the first distance. The steering angle controller performs first control on the steering angle so that an absolute value of the first lateral positional deviation decreases, and second control on the steering angle based on the second lateral positional deviation so that a difference between a change amount of the steering angle in the first control and a change amount of an actual steered angle that is a steered angle of wheels of the vehicle decreases.

9 Claims, 7 Drawing Sheets

AUTOMATIC STEERING CONTROL DEVICE

CROSS-REFERENCE TO RELATED APPLICATIONS

The present application claims priority from Japanese Patent Application No. 2019-057258 filed on Mar. 25, 2019, the entire contents of which are hereby incorporated by reference.

BACKGROUND

The technology relates to an automatic steering control device that performs automatic steering control for causing an own vehicle to travel along a lane.

Various driving assistance devices using an automatic driving technology have been recently developed and put into practical use for vehicles so that drivers can drive more comfortably and safely. An automatic steering control device that performs automatic steering control for causing an own vehicle to travel along a lane is known as one of such driving assistance devices. The automatic steering control is performed so that the traveling road of the own vehicle is estimated based on a recognition result of the lane obtained by a camera installed in the own vehicle, and the steering angle of the own vehicle is controlled to maintain the own vehicle at the center of the traveling road.

It has been conventionally known that the steered angle of wheels (hereinafter also referred to as an actual steered angle) when the steering angle of a steering wheel is changed exhibits a hysteresis characteristic due to a backlash or the like existing in a transmission mechanism or a steering mechanism. Such a hysteresis characteristic causes a delay in the operation of an electric power steering device.

The electric power steering device can generate an assist torque for assisting a driver's steering operation by controlling a drive current to be supplied to an electric power steering motor according to the magnitude of a steering torque or the like. In addition, the electric power steering device controls the drive current so that no assist torque is generated to enhance straight-traveling stability when the magnitude of the steering torque is near to zero. The range of the steering torque in which the drive current is controlled so as to generate no assist torque is called a dead zone.

Japanese Unexamined Patent Application Publication (JP-A) No. 2002-331947 discloses an electric power steering device that absorbs backlash in advance by driving a motor when the steering torque is within a dead zone, thereby generating an assist torque without causing any time delay when a steering torque exceeding the dead zone is detected. In this electric power steering device, the positive or negative of the drive current to be applied to the electric power steering motor is determined in advance based on the direction of the detected steering torque.

SUMMARY

An aspect of the technology provides an automatic steering control device configured to perform automatic steering control that causes an own vehicle to travel along a target traveling road. The device includes a forward recognition device, a traveling state detector, a lateral positional deviation calculator, a steering angle controller. The forward recognition device is configured to recognize a traveling environment ahead of the own vehicle. The traveling state detector is configured to detect information on a traveling state of the own vehicle. The lateral positional deviation calculator is configured to calculate a target position ahead of the own vehicle and an estimated position of the own vehicle based on a recognition result by the forward recognition device and a detection result by the traveling state detector, and calculate a lateral positional deviation that is a deviation in a vehicle width direction of the own vehicle from the target position to the estimated position. The steering angle controller is configured to control a steering angle of the own vehicle based on the lateral positional deviation. The lateral positional deviation calculator is configured to calculate a first lateral positional deviation that is the lateral positional deviation at a position that is forward away from the own vehicle by a first distance at any time point, and a second lateral positional deviation that is the lateral positional deviation at a position that is forward away from the own vehicle by a second distance larger than the first distance at the any time point. The steering angle controller is configured to perform first steering control that controls the steering angle so that an absolute value of the first lateral positional deviation decreases, and second steering control that controls the steering angle based on the second lateral positional deviation so that a difference between a change amount of the steering angle in the first steering control and a change amount of an actual steered angle that is a steered angle of wheels of the own vehicle decreases.

An aspect of the technology provides an automatic steering control device configured to perform automatic steering control that causes an own vehicle to travel along a target traveling road. The system includes a forward recognition device, a traveling state sensor, and circuitry. The forward recognition device is configured to recognize a traveling environment ahead of the own vehicle. The traveling state sensor is configured to detect information on a traveling state of the own vehicle. The circuitry is configured to calculate a target position ahead of the own vehicle and an estimated position of the own vehicle based on a recognition result by the forward recognition device and a detection result by the traveling state sensor, calculate a lateral positional deviation that is a deviation in a vehicle width direction of the own vehicle from the target position to the estimated position, and control a steering angle of the own vehicle based on the lateral positional deviation. The circuitry is configured to calculate a first lateral positional deviation that is the lateral positional deviation at a position that is forward away from the own vehicle by a first distance at any time point, and a second lateral positional deviation that is the lateral positional deviation at a position that is forward away from the own vehicle by a second distance larger than the first distance at the any time point, and perform first steering control that controls the steering angle so that an absolute value of the first lateral positional deviation decreases, and second steering control that controls the steering angle based on the second lateral positional deviation so that a difference between a change amount of the steering angle in the first steering control and a change amount of an actual steered angle that is a steered angle of wheels of the own vehicle decreases.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

In the following, some embodiments of the technology are described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

Even in the automatic steering control, the hysteresis characteristic and the dead zone described above are factors for causing a delay in a response of the actual steered angle (hereinafter referred to as vehicle response) when the steering angle is automatically changed. The delay in the vehicle response in the automatic steering control has caused a problem that it causes turning delay of the steering angle and excessive turning of the steering angle caused by the turning delay of the steering angle, resulting in meandering of the vehicle.

Note that in the electric power steering device disclosed in JP-A No. 2002-331947, the direction of a steering operation subsequent to a detection time point of a steering torque is estimated based on a detection result of the steering torque, and the positive of negative of the drive current to be applied to the electric power steering motor is determined based on an estimation result. However, the steering operation is not performed by a driver in the automatic steering control, so that it is difficult to estimate the steering angle of the steering wheel after the detection time point based on the detection result of the steering torque.

Therefore, it is desirable in the technology to provide an automatic steering control device capable of preventing the turning delay and the excessive turning of the steering angle caused by the automatic steering control, thereby preventing meandering of a vehicle.

Figure 1:
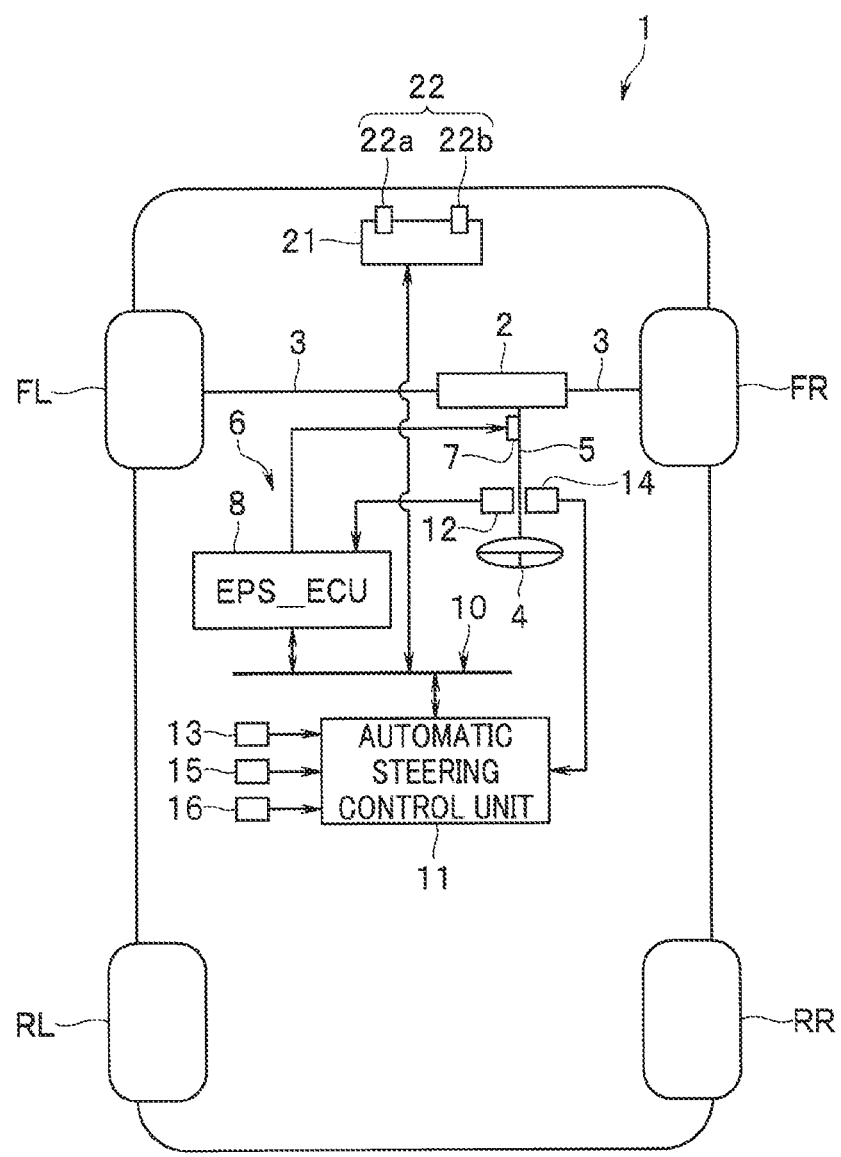
FIG. 1 is a diagram illustrating a schematic configuration of a vehicle including an automatic steering control device according to an embodiment of the technology.

Hereinafter, an example of the technology will be described with reference to the drawings. First, a schematic configuration of a vehicle including an automatic steering control device according to the example of the technology will be described with reference to FIG. 1. As illustrated in FIG. 1, the vehicle 1 includes a front left wheel FL, a front right wheel FR, a rear left wheel RL, and a rear right wheel RR. A case where the front right and left wheels FR and FL serve as driving wheels and steering wheels will be described as an example.

The vehicle 1 is further provided with a steering mechanism 2 such as a rack and pinion mechanism. The front right and left wheels FR and FL are coupled to the steering mechanism 2 via tie rods 3, and a steering shaft 5 which is fixed to a steering wheel 4 at the distal end thereof is coupled to the steering mechanism 2. The front right and left wheels FR and FL are turned in a right-and-left direction via the steering mechanism 2 by a driver's operation on the steering wheel 4.

The vehicle 1 is further provided with an electric power steering device (hereinafter referred to as an EPS device) 6. The EPS device 6 includes an electric power steering motor (hereinafter referred to as an EPS motor) 7, and an electric power steering control unit (hereinafter referred to as an EPS control unit) 8. Note that the EPS control unit is represented by EPS_ECU in FIG. 1. The EPS motor 7 is coupled to the steering shaft 5 via a transmission mechanism (not illustrated).

A steering torque sensor 12 is coupled to the EPS control unit 8. The EPS control unit 8 sets an assist torque for assisting the driver's steering torque based on detection results of the steering torque sensor 12, a vehicle speed sensor described later, etc. The EPS control unit 8 controls the EPS motor 7 so that the set assist torque is applied to the steering shaft 5.

The vehicle 1 is further provided with an automatic steering control unit 11. The EPS control unit 8 and the automatic steering control unit 11 are coupled to an in-vehicle network 10 such as a controller area network (CAN). Although not illustrated, the in-vehicle network 10 is further coupled to a plurality of electronic control units that control a traveling state of the vehicle 1, such as an engine control unit, a transmission control unit, and a brake control unit.

The automatic steering control unit 11 is a device that constitutes a main part of the automatic steering control device 100 according to the present example and performs automatic steering control for causing the vehicle 1 to travel along a target traveling road. When the automatic steering control is performed, the automatic steering control unit 11 sets a target torque as the assist torque, and transmits a command signal corresponding to the set target torque to the EPS control unit 8. The EPS control unit 8 controls the EPS motor 7 based on the received command signal so that the set target torque is applied to the steering shaft 5.

The automatic steering control unit 11 performs automatic steering control, for example, when detecting an operation of turning on a switch for the automatic steering control or the like by the driver. Furthermore, the automatic steering control unit 11 cancels the automatic steering control when detecting a predetermined driving operation such as a steering wheel operation by the driver or an operation of a release switch for the automatic steering control or the like.

The automatic steering control unit 11 is coupled to a sensor group as a traveling state detector that detects information on the traveling state of the vehicle 1 and that includes a vehicle speed sensor 13 for detecting a vehicle speed of the vehicle 1, a steering angle sensor 14 for detecting a steering angle and a steering direction of the vehicle 1, a yaw rate sensor 15 for detecting a yaw rate (yaw angular velocity) of the vehicle 1, and a lateral acceleration sensor 16 for detecting a lateral acceleration of the vehicle 1. Note that the positive or negative of each of the steering angle and yaw rate of the vehicle 1 is defined according to whether the vehicle 1 turns left or turns right. The positive or negative sign of the lateral acceleration of the vehicle 1 is defined according to whether the vehicle 1 travels leftward or travels rightward.

Figure 2:
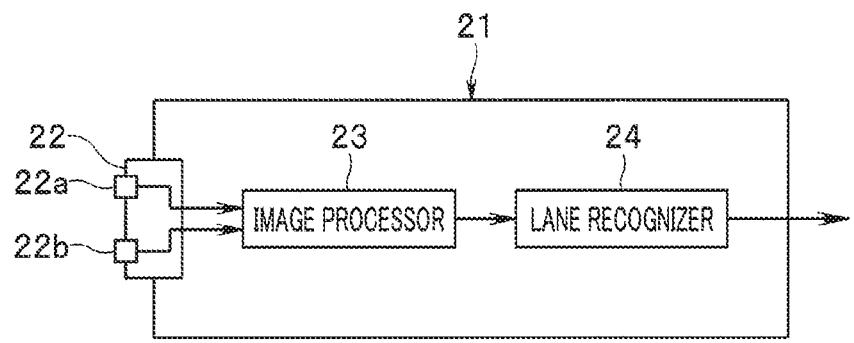
FIG. 2 is a functional block diagram illustrating a configuration of a camera unit in the embodiment of the technology.

The vehicle 1 is further provided with a camera unit 21 as a front recognition device. Here, the camera unit 21 will be described in detail with reference to FIGS. 1 and 2. FIG. 2 is a functional block diagram illustrating a configuration of the camera unit 21. The camera unit 21 includes an in-vehicle camera 22 configured by a stereo camera including a main camera 22a and a sub camera 22b, an image processor 23, and a lane recognizer 24.

Each of the cameras 22a and 22b is disposed in the vicinity of a windshield in the vehicle interior so as to be spaced from the center in the vehicle width direction of the vehicle 1 at a predetermined interval, for example. Each of the cameras 22a and 22b includes an imaging element such as CCD or CMOS. The imaging element captures an image of a traveling environment which is ahead of the vehicle 1 in the traveling direction in which the vehicle 1 is traveling.

The image processor 23 converts a pair of analog images captured by the cameras 22a and 22b into digital images having predetermined luminance gradations. Furthermore, the image processor 23 generates reference image data based on an image captured by the main camera 22a, and generates comparison image data based on an image captured by the sub camera 22b. The image processor 23 calculates distance data representing the distance from the vehicle 1 to an object based on the parallax between the reference image data and the comparison image data.

The lane recognizer 24 recognizes lane markings drawn on the right and left sides of a lane in which the vehicle 1 travels, and based on a recognition result of the lane markings, the lane recognizer 24 calculates a vehicle lateral position which is the position in the vehicle width direction of the vehicle 1, a target lateral position, curvature of the lane in which the vehicle 1 travels (hereinafter referred to as lane curvature), and a yaw angle of the vehicle 1 with respect to the lane (hereinafter referred to as a yaw-angle-to-lane). In the present example, the target lateral position is the center of the lane defined by the right and left lane markings. Note that the positive or negative of the curvature is defined according to whether the vehicle 1 turns left or turns right.

For example, the lane recognizer 24 calculates the lane curvature as follows. First, a virtual road plane is generated based on the reference image data and the comparison image data. Subsequently, based on the distance data, inner edges of the right and left lane markings are plotted on the generated virtual road plane. Subsequently, the curvatures of the right and left inner edges are calculated. Subsequently, the lane curvature is calculated based on the curvatures of the right and left inner edges.

Each of the EPS control unit 8, the automatic steering control unit 11, and the camera unit 21 is configured by a microcomputer as a main component that includes a CPU, ROM, RAM, and the like, for example. A control program for realizing an operation set for each system is stored in the ROM. The functions of the EPS control unit 8, the automatic steering control unit 11, and the camera unit 21 are realized by reading and executing the control program from the ROM by the CPU.

Figure 3:
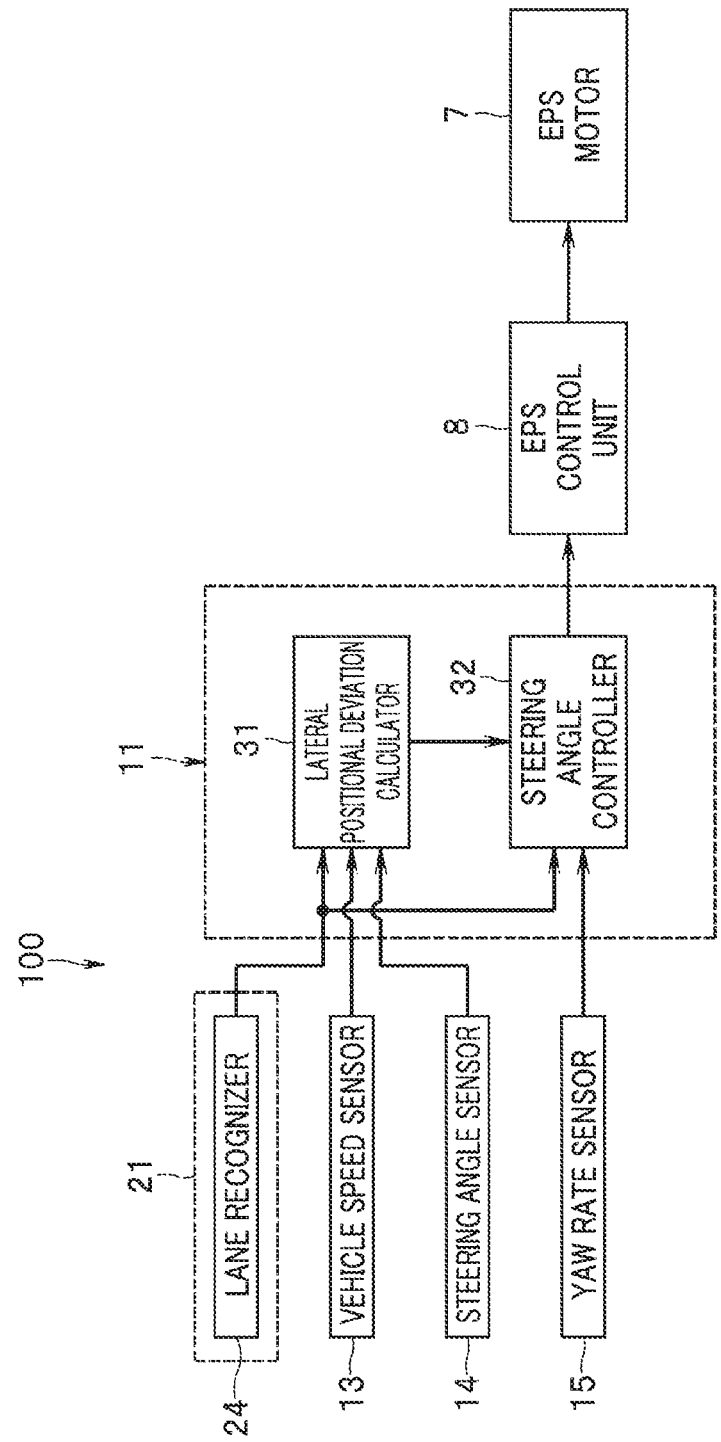
FIG. 3 is a functional block diagram illustrating a configuration of a main part of the automatic steering control device according to the embodiment of the technology.

Next, the configuration of the automatic steering control device 100 according to the present example will be described with reference to FIG. 3. FIG. 3 is a functional block diagram illustrating a configuration of a main part of the automatic steering control device 100. The automatic steering control device 100 includes the automatic steering control unit 11, the camera unit 21, and the sensor group including the vehicle speed sensor 13, the steering angle sensor 14, the yaw rate sensor 15, and the like. The automatic steering control unit 11 includes a lateral positional deviation calculator 31 and a steering angle controller 32.

The lateral positional deviation calculator 31 calculates a target position which is ahead of the vehicle 1 and an estimated position of the vehicle 1 based on the recognition result by the lane recognizer 24 of the camera unit 21 and the detection results of the sensor group such as the vehicle speed sensor 13, the steering angle sensor 14 and the like. Specifically, the lateral positional deviation calculator 31 calculates the target position and the estimated position at a predetermined position by using the vehicle lateral position, the target lateral position, the lane curvature, and the yaw-angle-to-lane which are calculated by the lane recognizer 24, the vehicle speed detected by the vehicle speed sensor 13, and the steering angle detected by the steering angle sensor 14. The lateral positional deviation calculator 31 uses the calculated target position and the estimated position to calculate a lateral positional deviation which is a deviation in the vehicle width direction of the vehicle 1 from the target position to the estimated position.

The steering angle controller 32 controls the steering angle of the vehicle 1 based on the lateral positional deviation calculated by the lateral positional deviation calculator 31. In the present example, the steering angle controller 32 calculates a target steering angle based on the lateral positional deviation, calculates a target torque for turning the vehicle 1 so that the steering angle of the vehicle 1 is equal to the target steering angle, and transmits a command signal corresponding to the target torque to the EPS control unit 8. The EPS control unit 8 receives the command signal corresponding to the target torque, and controls the EPS motor 7 based on the received command signal so that the target torque is applied to the steering shaft 5. In this way, the steering angle of the vehicle 1 is controlled.

Here, an example of a method for setting the target steering angle will be described. First, the steering angle controller 32 acquires information on the lane curvature from the lane recognizer 24, and calculates a target steering angle for causing the vehicle 1 to travel along the lane curvature (hereinafter referred to as a first initial target steering angle). Next, the steering angle controller 32 acquires information on the yaw-angle-to-lane from the lane recognizer 24, and calculates a target steering angle for making the yaw-angle-to-lane coincide with a predetermined target yaw angle (hereinafter referred to as a second initial target steering angle). Next, the steering angle controller 32 acquires information on the lateral positional deviation from the lateral positional deviation calculator 31, and calculates a target steering angle for making the lateral positional deviation equal to zero (hereinafter referred to as a third initial target steering angle). Next, the steering angle controller 32 sets the sum of the first to third initial target steering angles as a target steering angle.

Particularly, in the present example, the lateral positional deviation calculator 31 calculates a first lateral positional deviation d1 defined as a lateral positional deviation at a position which is forward away from the vehicle 1 by a first forward gaze distance at any time point, and a second lateral positional deviation d2 defined as a lateral positional deviation at a position which is forward away from the vehicle 1 by a second forward gaze distance larger than the first forward gaze distance at the any time point. The first forward gaze distance is, for example, a distance by which the vehicle 1 travels in T1 seconds. The second forward gaze distance is, for example, a distance by which the vehicle 1 travels in (T1+ΔT) seconds. T1 is equal to, for example, 1.2 seconds, and ΔT is, for example, in a range of 0.3 to 2 seconds. Each of T1 and ΔT may be a value which changes according to the vehicle speed or may be a constant value.

Figure 4:
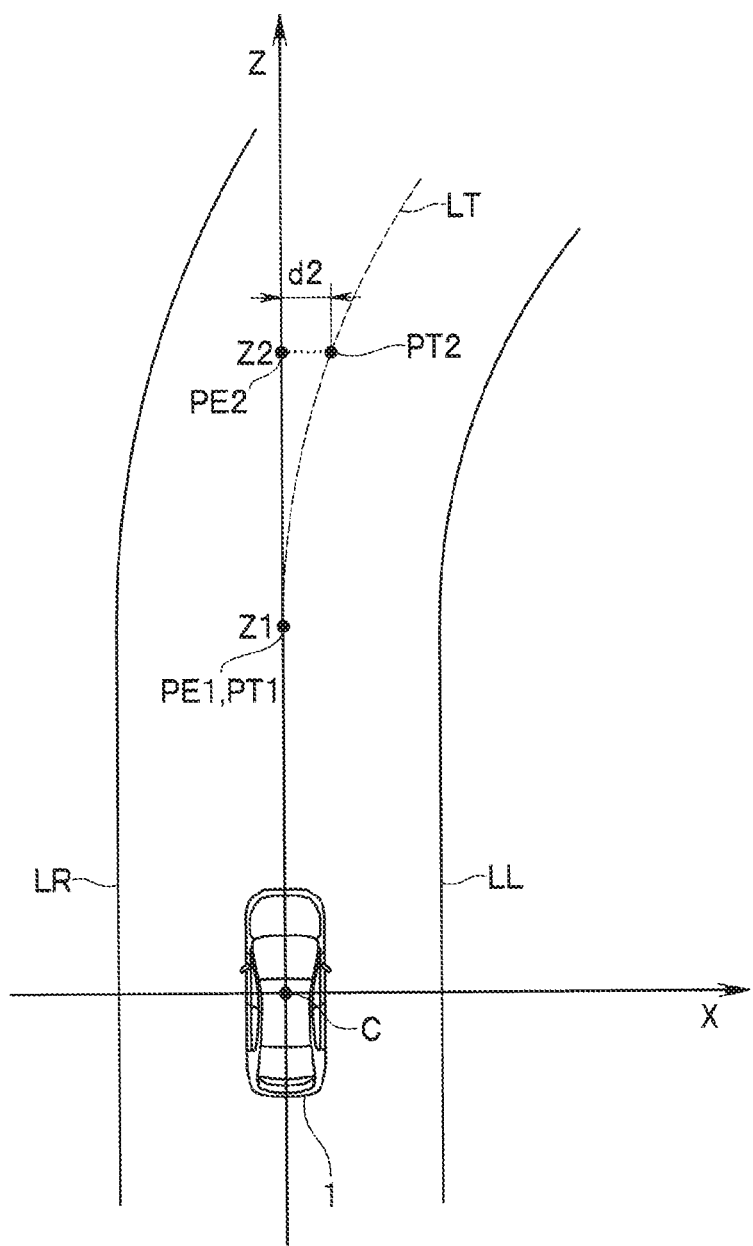
FIG. 4 is an explanatory diagram describing first and second lateral positional deviations in the embodiment of the technology.

Hereinafter, the first and second lateral positional deviations d1 and d2 will be described in detail with reference to FIG. 4. FIG. 4 is an explanatory diagram describing the first and second lateral positional deviations d1 and d2. In FIG. 4, the position of the center of gravity C of the vehicle 1 is set to an origin, the vehicle width direction of the vehicle 1 is set to an X axis, and a vehicle length direction of the vehicle 1 is set to a Z axis. In FIG. 4, solid lines with symbols LR and LL represent lane markings defining the right and left of the traveling lane, and a broken line with a symbol LT represents a locus of the target position.

Here, the first forward gaze distance is represented by Z1, and the second forward gaze distance is represented by Z2. In FIG. 4, points marked with symbols PE1 and PT1 indicate the estimated position and the target position at a position which is forward away from the vehicle 1 by the first forward gaze distance Z1, respectively. Furthermore, points marked with symbols PE2 and PT2 indicate the estimated position and the target position at a position which is forward away from the vehicle 1 by the second forward gaze distance Z2, respectively. The lateral positional deviation calculator 31 calculates a deviation in a direction parallel to the X axis from the target position PT1 to the estimated position PE1 as the first lateral positional deviation d1. Likewise, the lateral positional deviation calculator 31 calculates a deviation in the direction parallel to the X axis from the target position PT2 to the estimated position PE2 as the second lateral positional deviation d2.

The steering angle controller 32 performs first steering control for controlling the steering angle so that the absolute value of the first lateral positional deviation d1 decreases. Specifically, the steering angle controller 32 sets the target steering angle and the target torque as described above based on the first lateral positional deviation d1 to control the steering angle.

The steering angle controller 32 further performs second steering control for controlling the steering angle based on the second lateral positional deviation d2 so that a difference between a change amount of the steering angle in the first steering control and a change amount of the actual steered angle that is the steered angle of the wheels of the vehicle 1 is reduced. The second steering control is performed before the first steering control.

Note that FIG. 4 illustrates an example in which the first lateral positional deviation d1 is remarkably smaller than the second lateral positional deviation d2. In FIG. 4, the estimated position PE1 and the target position PT1 are illustrated to coincide each other for convenience.

Here, the steering angle at the "any time point" described above at which the first and second lateral positional deviations d1 and d2 are calculated is referred to as a first angle $\theta 1$, and it is assumed that the steering angle is changed from the first angle $\theta 1$ in a direction in which the absolute value of the first lateral positional deviation d1 decreases. When the steering angle is changed as described above, the actual steered angle may not change until the steering angle changes to some extent due to backlash of the steering mechanism 2 or the like. In this case, the actual steered angle can be changed by continuing to change the steering angle.

Here, a steering angle at which the actual steered angle starts to change when the steering angle is changed as described above is referred to as a second angle $\theta 2$.

Figure 5:
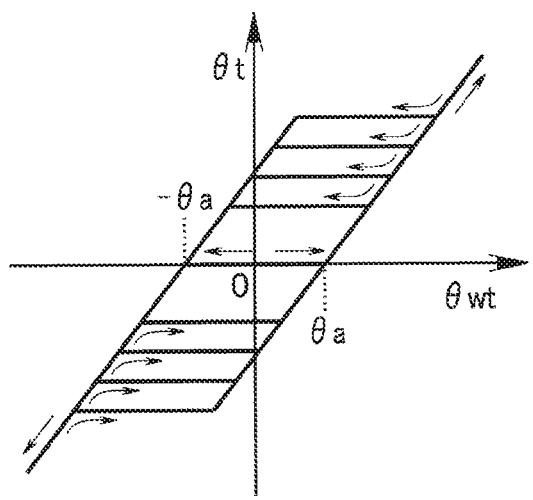
FIG. 5 is an explanatory diagram describing first and second angles in the embodiment of the technology.

Hereinafter, the first and second angles $\theta 1$ and $\theta 2$ will be described in detail with reference to FIG. 5. FIG. 5 is an explanatory diagram describing the first and second angles $\theta 1$ and $\theta 2$. In FIG. 5, the horizontal axis represents the steering angle $\theta wt$, and the vertical axis represents the actual steered angle $\theta t$. Arrows in FIG. 5 indicate directions in which the steering angle $\theta wt$ is changed. Note that in FIG. 5, $\theta wt$ and $\theta t$ when the vehicle 1 turns to left are represented by positive values, and $\theta wt$ and $\theta t$ when the vehicle 1 turns to right are represented by negative values.

A right-pointing arrow in the vicinity of the horizontal axis in FIG. 5 indicates a case where the steering angle $\theta wt$ is increased so that the vehicle 1 turns to left under straight traveling, that is, from a state where the steering angle $\theta wt$ is 0°. In this case, when the steering angle $\theta wt$ is equal to or smaller than $\theta a$ ($\theta a > 0$), the actual steered angle $\theta t$ does not change. When the steering angle $\theta wt$ increases to be larger than $\theta a$, the actual steered angle $\theta t$ also increases as the steering angle $\theta wt$ increases. Furthermore, a left-pointing arrow in the vicinity of the horizontal axis in FIG. 5 indicates a case where the steering angle $\theta wt$ is increased so that the vehicle 1 turns right from a state where the steering angle $\theta wt$ is 0°. In this case, when the steering angle $\theta wt$ is equal to or more than $-\theta a$, the actual steered angle $\theta t$ does not change. When the steering angle $\theta wt$ is less than $-\theta a$, the actual steered angle $\theta t$ also decreases as the steering angle $\theta wt$ decreases. When the steering angle $\theta wt$ is changed from the state of 0°, $\theta a$ and $-\theta a$ correspond to the second angle $\theta 2$ described above. In this case, the first angle $\theta 1$ is 0°. The reason why the actual steered angle $\theta t$ does not change when the steering angle $\theta wt$ is within a range from not less than $-\theta a$ to not more than $\theta a$ resides in that the backlash described above and a dead zone for enhancing straight-traveling stability exist.

Note that the same phenomenon as the case where the steering angle $\theta wt$ is changed from the state of 0° occurs due to the aforementioned backlash even when the steering angle $\theta wt$ is turned back from the left to the right and when the steering angle $\theta wt$ is turned back from the right to the left. Left-pointing arrows in FIG. 5 (except for the arrow in the vicinity of the horizontal axis) indicate a case where the steering angle $\theta wt$ is turned from the left to the right. In this case, the actual steered angle $\theta t$ does not change until the steering angle $\theta wt$ has decreased to some extent, but the actual steered angle $\theta t$ also decreases as the steering angle $\theta wt$ decreases when the steering angle $\theta wt$ has decreased to some extent.

Right-pointing arrows in FIG. 5 (except for the arrow in the vicinity of the horizontal axis) indicate a case where the steering angle $\theta wt$ is turned back from the right to the left. In this case, the actual steered angle $\theta t$ does not change until the steering angle $\theta wt$ has increased to some extent, but the actual steered angle $\theta t$ also increases as the steering angle $\theta wt$ increases when the steering angle $\theta wt$ has increased to some extent.

Here, a difference ($\theta 2 - \theta 1$) between the first angle $\theta 1$ and the second angle $\theta 2$ is referred to as a third angle, and represented by a symbol $\theta hys$. In the present example, the second steering control is performed when the vehicle 1 enters a curve from a straight road. In other words, the second steering control is performed when the steering angle $\theta wt$ is an angle equal to or near to 0°. In this case, the third angle $\theta hys$ is equal to or substantially equal to $\theta a$ or $-\theta a$. In the second steering control, the steering angle $\theta wt$ is controlled so that the absolute value of a difference between the steering angle and the third angle θhys at the start time point of the first steering control becomes small.

Figure 6:
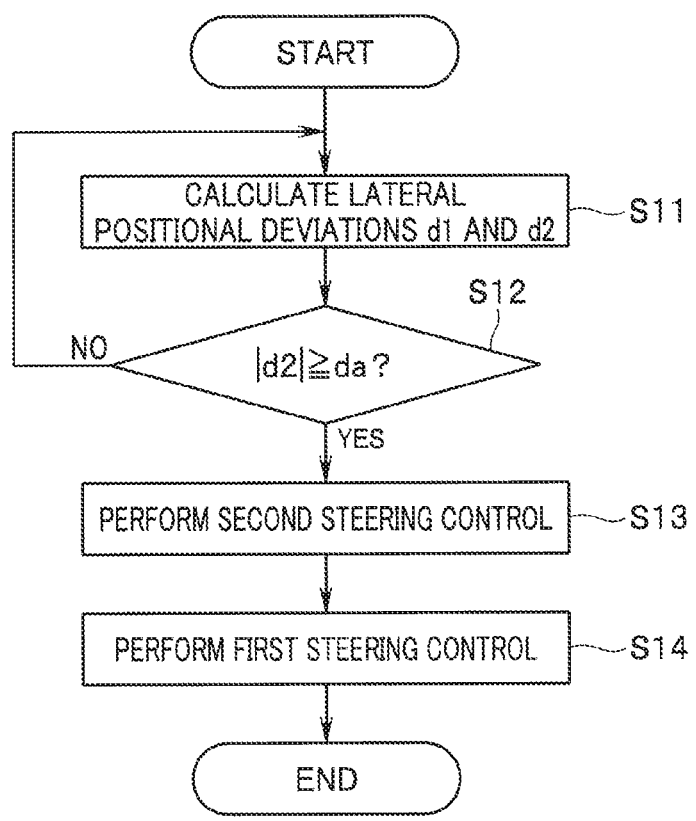
FIG. 6 is a flowchart illustrating automatic steering control in the embodiment of the technology.

Next, the automatic steering control in the present example will be specifically described with reference to FIG. 6. FIG. 6 is a flowchart illustrating the automatic steering control. When the automatic steering control is performed, a series of processing illustrated in FIG. 6 is repeatedly performed. In the automatic steering control, first, the lateral positional deviation calculator 31 calculates the first and second lateral positional deviations d1 and d2 (step S11). Next, the steering angle controller 32 determines whether the absolute value |d2| of the second lateral positional deviation d2 is not less than a predetermined threshold value da (da>0) (step S12). The threshold value da is defined, for example, from the viewpoint of removing noise in the automatic steering control. If |d2| is less than da (NO), the processing returns to step S11.

If |d2| is not less than da in step S12 (YES), the steering angle controller 32 performs the second steering control (step S13). For example, the steering angle controller 32 performs the second steering control so that the amount of change in the steering angle θwt coincides or substantially coincides with the third angle θhys. Hereinafter, such second steering control is referred to as second steering control of a first example.

Next, the steering angle controller 32 preforms the first steering control (step S14), and ends the series of processing of one time.

Next, second steering control of a second example will be described. The second steering control of the second example is performed instead of the steering control of the first example. In the second example, the steering angle controller 32 sets the change amount of the steering angle θwt to a predetermined value. The predetermined value is, for example, within a range where the absolute value of the predetermined value is more than 0° and is not more than 2°. When the steering angle θwt is increased so as to cause the vehicle 1 to turn left, the predetermined value is set to 2° in one example. Furthermore, the steering angle controller 32 changes the steering angle θwt so that the steering angle θwt changes with time, and the speed of the change of the steering angle θwt becomes a predetermined speed. The predetermined speed is, for example, within a range where the absolute value of the predetermined speed is more than 0°/s and is not more than 5°/s. The predetermined value and the predetermined speed may be changed according to the vehicle speed, or may be constant values.

Next, second steering control of a third example will be described. The second steering control of the third example is performed instead of the steering control of the first example. In the third example, the steering angle controller 32 sets the change amount of the steering angle θwt to a predetermined value. The predetermined value is, for example, within a range where the absolute value of the predetermined value is more than 0° and is not more than 2°. When the steering angle θwt is increased so that the vehicle 1 turns left, the predetermined value is set to 2° in one example. The predetermined value may be changed according to the vehicle speed or may be a constant value.

Figure 7:
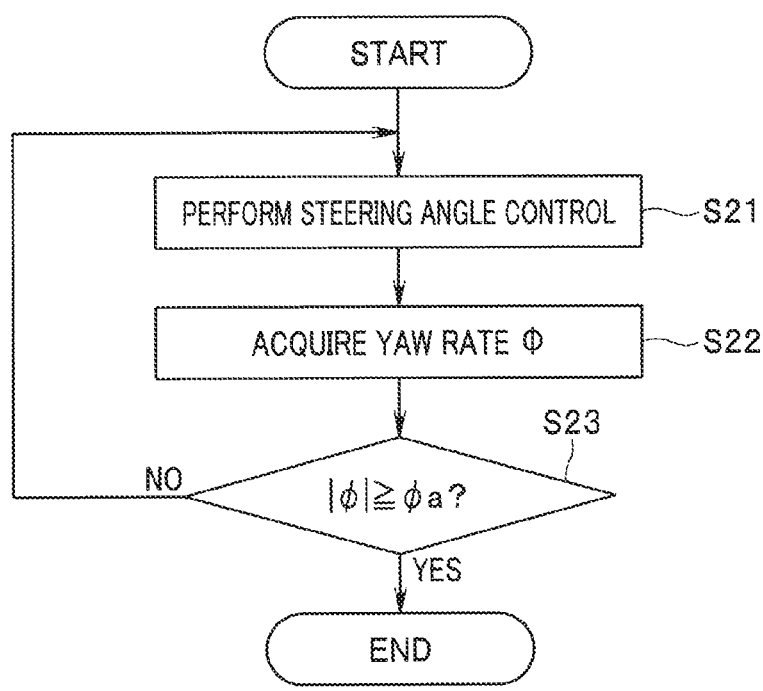
FIG. 7 is a flowchart illustrating second steering control of a fourth example in the embodiment of the technology.

Next, second steering control of a fourth example will be described with reference to FIG. 7. FIG. 7 is a flowchart illustrating the second steering control of the fourth example. In the fourth example, the steering angle controller 32 changes the steering angle θwt with time as in the case of the second example described above.

As illustrated in FIG. 7, in the fourth example, the steering angle controller 32 first performs the steering angle control based on the second steering control (step S21). Next, the steering angle controller 32 acquires a yaw rate φ from the yaw rate sensor 15 (step S22). Next, the steering angle controller 32 determines whether the absolute value |φ| of the yaw rate φ is not less than a predetermined threshold value φa (φa>0) (step S23). When |φ| is not less than φa (YES), the steering angle controller 32 ends the second steering control. If |φ| is less than φa (NO), the processing returns to step S21.

Next, an operation and an effect of the automatic steering control device 100 according to the present example will be described. In the present example, the steering angle controller 32 performs the first steering control for controlling the steering angle θwt so that the absolute value of the first lateral positional deviation d1 decreases, and the second steering control for controlling the steering angle θwt based on the second lateral positional deviation d2 so that the difference between the change amount of the steering angle θwt in the first steering control and the change amount of the actual steered angle θt decreases. In the present example, particularly, the second steering control is performed before the first steering control, and the steering angle θwt is controlled so that the absolute value of the difference between the steering angle θwt and the third angle θhys at the start time point of the first steering control decreases. As a result, according to the present example, it is possible to prevent the vehicle 1 from meandering by preventing the turning delay and excessive turning of the steering angle θwt due to the automatic steering control.

The foregoing effect in the present example will be described hereinafter in detail while comparing with a steering angle controller of a comparative example. The steering angle controller of the comparative example does not perform the second steering control in the present example, but performs the steering control of the comparative example which corresponds to the first steering control in the present example. In the steering control of the comparative example, the steering angle θwt is controlled based on the first lateral positional deviation d1.

Here, the steering angle θwt based on the steering control of the comparative example is represented by a symbol θw0, and the change amount of the steering angle θwt based on the steering control of the comparative example is represented by a symbol θd0. An effective steering angle excluding the influence of the backlash and the dead zone is equal to θw0−θhys (where |θd0|>|θhys|) or 0 (where |θd0|≤|θhys|) by using the third angle θhys. It is assumed that the actual steered angle θt is represented by a value obtained by multiplying the effective steering angle by a predetermined gain g. The actual steered angle θt based on the steering control of the comparative example is equal to g(θw0−θhys) (where |θd0|>|θhys|) or 0 (where |θd0|≤|θhys|).

In the comparative example, the actual steered angle θt does not change until |θd0| has exceeded |θhys|, that is, until θw0 has exceeded the second angle θ2. In other words, in the comparative example, turning delay occurs according to the time until θw0 has exceeded θ2. When the turning delay occurs, the excessive turning of the steering angle θwt occurs, so that the vehicle meanders.

On the other hand, in the present example, the difference between the change amount of the steering angle θwt in the first steering control and the change amount of the actual steered angle θt is reduced by the second steering control. Here, a value which is the change amount of the steering angle θwt in the second steering control and obtained by subtracting the steering angle θwt before the change from the steering angle θwt after the change is represented by a symbol θd, and the steering angle θwt calculated based on the first lateral positional deviation d1 is represented by a symbol θw1. An effective steering angle based on the first steering control is equal to θw1+θd−θhys.

As described above, in the first example, θd coincides or substantially coincides with θhys. As a result, in the first example, the effective steering angle is equal or substantially equal to θw1, and the actual steered angle θt based on the first steering control is equal or substantially equal to g·θw1. As a result, the difference between the change amount of the steering angle θwt in the first steering control and the change amount of the actual steered angle θt is equal or substantially equal to 0. Therefore, in the first example, the actual steered angle θt changes as per θw1 calculated based on the first lateral positional deviation d1.

In the case where the change amount of the steering angle θwt is set to a predetermined value as in the case of the second and third examples described above, or in the case where the second steering control is ended when the yaw rate φ is equal to or more than the predetermined threshold value φa as in the case of the fourth example described above, θd does not necessarily coincide with θhys. However, in these cases, the signs of θd and θhys coincide with each other. Therefore, the difference between θw1 calculated based on the first lateral positional deviation d1 and the effective steering angle is reduced by the amount corresponding to θd. As a result, the difference between the change amount of the steering angle θwt in the first steering control and the change amount of the actual steered angle θt is smaller than that in the case where the second steering control is not performed.

As described above, in the present example, the difference between the change amount of the steering angle θwt in the first steering control and the change amount of the actual steered angle θt is reduced by the second steering control. As a result, according to the present example, the vehicle 1 can be prevented from meandering by preventing the turning delay and excessive turning of the steering angle θwt due to the automatic steering control.

Note that in the present example, the change amount of the effective steering angle based on the second steering control is equal to θd−θhys (where |θd|>|θhys|) or 0 (where |θd|≤|θhys|). When θd is caused to coincide or substantially coincide with θhys as in the case of the first example, the effective steering angle is equal or substantially equal to 0. In the third and fourth examples, the effective steering angle is 0 in the case of |θd|≤|θhys|, and the absolute value of the change amount of the effective steering angle is smaller than |θd| in the case of |θd|>|θhys|. Therefore, in the present example, the actual steered angle θt does not change or hardly changes due to the second steering control.

In the present example, the second steering control is performed when the absolute value of the second lateral positional deviation d2 is not less than a predetermined threshold value da. As a result, according to the present example, the stability of the automatic steering control can be enhanced, and thereby meandering of the vehicle 1 can be prevented.

Furthermore, in the second steering control of the fourth example in the present example, the steering angle controller 32 ends the second steering control when the absolute value |φ| of the yaw rate φ is equal to or more than the predetermined threshold value φa during performing the second steering control. In other words, when the vehicle 1 is slightly tilted during performing the second steering control, the steering angle controller 32 ends the second steering control. As a result, according to the present example, the stability of the automatic steering control can be enhanced, so that meandering of the vehicle 1 can be prevented.

The examples of the present technology are not limited to the above-described examples, and various changes, modifications, etc., can be made without departing from the subject matter of the present technology. For example, in the second steering control of the first example, the steering angle controller 32 may change the steering angle θwt with time so that the change amount of the steering angle θwt coincides or substantially coincides with the third angle θhys, and change the steering angle θwt so that the speed of the change of the steering angle θwt is equal to the predetermined speed.

In the second steering control of the fourth example, even in the case where the absolute value |φ| of the yaw rate φ is less than the predetermined threshold value φa, the steering angle controller 32 may end the second steering control when the change amount of the steering angle θwt coincides or substantially coincides with the third angle θhys, or when the change amount of the steering angle θwt reaches a predetermined value.

Each of the EPS control unit 8, the automatic steering control unit 11 and the camera unit 21 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the automatic steering control unit 11 including the lateral positional deviation calculator 31 and the steering angle controller 32 (see FIG. 3), and the camera unit 21 including the image processor 23 and the lane recognizer 24 (see FIG. 2). Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the modules illustrated in from FIG. 1 to FIG. 3.

Although some examples of the technology have been described in the foregoing by way of example with reference to the accompanying drawings, the technology is by no means limited to the examples described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. An automatic steering control device configured to perform automatic steering control that causes an own vehicle to travel along a target traveling road, the device comprising:

a forward recognition processor configured to recognize a traveling environment ahead of the own vehicle using data obtained by one or more sensors;

a traveling state sensor configured to detect information on a traveling state of the own vehicle; and circuitry configured to:
calculate a first target position ahead of the own vehicle and a first estimated position of the own vehicle at a first distance forward of the own vehicle based on a recognition result by the forward recognition processor and a detection result by the traveling state sensor;

calculate a second target position ahead of the own vehicle and a second estimated position of the own vehicle at a second distance forward of the own vehicle based on the recognition result by the forward recognition processor and the detection result by the traveling state sensor, the second distance being greater than the first distance;

calculate a first lateral positional deviation that is a first deviation from the target position to the first estimated position in a vehicle width direction of the own vehicle at the first distance;

calculate a second lateral positional deviation that is a second deviation from the target position to the second estimated position in the vehicle width direction of the own vehicle at the second distance; and control a steering angle of the own vehicle based on the lateral positional deviation, wherein the circuitry is configured to:
perform first steering control that controls the steering angle so that an absolute value of the first lateral positional deviation decreases, and second steering control that controls the steering angle based on the second lateral positional deviation to decrease a difference between a first steering angle of the own vehicle and a second steering angle of the own vehicle, wherein the first steering angle is a current steering angle of the own vehicle, wherein the second steering angle is a steering angle at which the own vehicle starts responding to the first steering control for reducing the absolute value of the first lateral positional deviation, and wherein the circuitry performs the first steering control subsequent to the second steering control.

2. The automatic steering control device according to claim 1, wherein the circuitry performs the second steering control by changing the steering angle by a predetermined angle.

3. The automatic steering control device according to claim 1, wherein the circuitry ends the second steering control when an absolute value of a yaw rate of the own vehicle is equal to or more than a predetermined threshold value during performing the second steering control.

4. An automatic steering control device configured to perform automatic steering control that causes an own vehicle to travel along a target path, the own vehicle comprising a motor configured to change a steering angle of the vehicle and a controller configured to control the motor, the device comprising:

a front recognition processor configured to recognize a traveling environment ahead of the own vehicle using data obtained by a camera unit;

a traveling state sensor configured to detect information on a traveling state of the own vehicle; and circuitry configured to determine that the own vehicle is traveling straight ahead based on the steering angle;

in response to a determination that the own vehicle is traveling straight ahead, calculate, at a first timing, a first lateral positional deviation based on a recognition result of the front recognition processor and a detection result of the traveling state sensor, the first lateral positional deviation being a deviation from the target path to a first estimated position in a vehicle width direction of the own vehicle, the first estimated position being a position of the own vehicle when the own vehicle travels straight ahead along a vehicle length direction of the own vehicle at the first timing for a predetermined first time from the first timing;

calculate, at the first timing, a second lateral positional deviation based on the recognition result by the front recognition processor and the detection result by the traveling state sensor, the second lateral positional deviation being a deviation from the target path to a second estimated position in the vehicle width direction of the own vehicle, the second estimated position being a position of the own vehicle when the own vehicle travels straight ahead along the vehicle length direction of the own vehicle at the first timing for a predetermined second time longer than the predetermined first time from the first timing;

in response to a calculation of the first lateral positional deviation, calculate a first target steering angle, the first target steering angle being an angle of change of the steering angle to decrease an absolute value of the first lateral position deviation;

in response to a calculation of the first target steering angle, transmit a first command to the controller at a second timing after the first timing, the first command being a command instructing the controller to change the steering angle by the calculated first target steering angle;

in response to a calculation of the second lateral positional deviation, determine that an absolute value of the second lateral positional deviation is greater than or equal to a predetermined first threshold value; and in response to a determination that the absolute value of the second lateral positional deviation is greater than or equal to the predetermined first threshold value, transmit a second command at a third timing after the first timing and before the second timing, the second command being a command instructing the controller to change the steering angle by a predetermined angle toward a first direction, the first direction being a direction of change in the steering angle to decrease the absolute value of the second lateral position deviation.

5. The automatic steering control device according to claim 4, wherein the predetermined second time is between 1.25 and 2.67 times the predetermined first time.

6. The automatic steering control device according to claim 4, wherein the predetermined second time is 0.3 to 2 seconds longer than the predetermined first time.

7. An automatic steering control device configured to perform automatic steering control that causes an own vehicle to travel along a target path, the own vehicle comprising a motor configured to change a steering angle of the vehicle and a controller configured to control the motor, the device comprising:

a front recognition processor configured to recognize a traveling environment ahead of the own vehicle using data obtained by a camera unit;

a traveling state sensor configured to detect information on a traveling state of the own vehicle; and circuitry configured to determine that the own vehicle is traveling straight ahead based on the steering angle;

in response to a determination that the own vehicle is traveling straight ahead, calculate, at a first timing, a first lateral positional deviation based on a recognition result by the front recognition processor and a detection result by the traveling state sensor, the first lateral positional deviation being a deviation from the target path to a first estimated position in a vehicle width direction of the own vehicle, the first estimated position being a position of the own vehicle when the own vehicle travels straight ahead along a vehicle length direction of the own vehicle at the first timing for a predetermined first time from the first timing;

calculate, at the first timing, a second lateral positional deviation based on the recognition result by the front recognition processor and the detection result by the traveling state sensor, the second lateral positional deviation being a deviation from the target path to a second estimated position in the vehicle width direction of the own vehicle, the second estimated position being a position of the own vehicle when the own vehicle travels straight ahead along the vehicle length direction of the own vehicle at the first timing for a predetermined second time longer then the predetermined first time from the first timing;

in response to a calculation of the first lateral positional deviation, calculate a first target steering angle, the first target steering angle being an angle of change of the steering angle to decrease an absolute value of the first lateral position deviation;

in response to a calculation of the first target steering angle, transmit a first command to the controller at a second timing after the first timing, the first command being a command instructing the controller to change the steering angle by the calculated first target steering angle;

in response to a calculation of the second lateral positional deviation, determine that an absolute value of the second lateral positional deviation is greater than or equal to a predetermined first threshold value; and in response to a determination that the absolute value of the second lateral positional deviation is greater than or equal to the predetermined first threshold value, i) start transmission of a second command to the controller at a third timing after the first timing and before the second timing and then ii) stop the transmission of the second command to the controller when an absolute value of a yaw rate of the own vehicle is greater than or equal to a second predetermined threshold value, the second command being a command instructing the controller to change the steering angle at a predetermined angular rate toward a first direction, the first direction being a direction of change in the steering angle to decrease the absolute value of the second lateral position deviation.

8. The automatic steering control device according to claim 7, wherein the predetermined second time is between 1.25 and 2.67 times the predetermined first time.

9. The automatic steering control device according to claim 7, wherein the predetermined second time is 0.3 to 2 seconds longer than the predetermined first time.

* * * * *